United States Patent [19]
Connell et al.

[11] 3,788,148
[45] Jan. 29, 1974

[54] ENERGY ABSORBER FOR COLLAPSIBLE STEERING COLUMNS OR THE LIKE

[75] Inventors: Lehman J. Connell, Frankenmuth; Jeffrey L. Johnson, Saginaw, both of Mich.

[73] Assignee: General Motors Corporation, Detroit, Mich.

[22] Filed: July 10, 1972

[21] Appl. No.: 269,941

[52] U.S. Cl. .................................. 74/492, 188/1 C
[51] Int. Cl. .............................................. B62d 1/18
[58] Field of Search ................ 74/492, 493; 188/1 C

[56] References Cited
UNITED STATES PATENTS
3,392,599  7/1968  White ................................. 74/492
3,538,783  11/1970  Butts .................................. 74/492

*Primary Examiner*—Allan D. Herrmann
*Attorney, Agent, or Firm*—D. L. Ellis

[57] ABSTRACT

A collapsible steering column for automobiles includes an energy absorber of the rollable deformer ball type and in which certain of the complement of deformer balls are sized predeterminedly with relation to the remainder of the ball complement and located in preformed recesses between the two telescopic tubes of the absorber so as to be inactive during a first portion of column collapse in which the remainder of the ball complement are active to provide a first level of the ball complement are active to provide a first level of energy absorption, whereafter in a later portion of column collapse the said certain balls engage in interfering relation between the walls of the tubes to provide a second level of energy absorption.

5 Claims, 8 Drawing Figures

PATENTED JAN 29 1974 3,788,148
SHEET 1 OF 2

ENERGY ABSORBER FOR COLLAPSIBLE STEERING COLUMNS OR THE LIKE

This invention relates to energy absorbers and more particularly to a rollable deformer ball type of energy absorber usable in telescopically collapsible steering column assemblies for automobiles or the like.

In U.S. Pat. No. 3,392,599 issued July 16, 1968 to R. L. White and assigned to the assignee of the present invention, there is disclosed an energy absorber utilizing rollable deformer balls engaged with predetermined interference fit between the walls of two tubular members of a telescopeable steering column assembly or the like. As explained in detail in that patent, such deformer balls are chosen to be of a hardness predeterminedly higher than the hardness of the walls they engage so that upon telescopic movement between such walls the balls are operative to perform plastic deformation or plastic strain grooving or plowing in such walls while the deformer balls roll therealong, thereby to absorb the energy of the telescopic motion. The force sustained in the assembly during such motion, and thus the energy absorption, is advantageously of a constant value during the telescopic motion.

In some applications it may be desirable to vary the force sustained in the assembly as for example, in collapsible steering columns for automobiles, where it is found that other forces such as inertia and friction add to the force sustained in the energy absorber during an initial period of collapse to make the total force sustained in the column assembly higher than desirable. Thus, in such situations, it can be advantageous to establish an initial low force level in the steering column assembly during a first portion or stage of collapse therein which will add to those extraneous forces and provide a total force in that first stage generally equal to that sustained in the energy absorber alone during a subsequent stage of energy absorption in which the extraneous forces are absent.

The present invention provides an energy absorber directed to the just noted desideratum by providing staged levels of force and energy absorption sustained in the energy absorber unit during different portions of the time or displacement history of operation of the unit.

The primary feature of this invention is that it provides an improved deformer ball type of telescopeable energy absorbing device incorporating staged levels of energy absorption. Another feature of this invention is that it provides an improved type of energy absorber wherein certain ones of the complement of deformer balls are substantially inoperative during a first portion of energy absorber displacement such that energy absorption is due only to the action of the remainder of the ball complement, whereafter at a selected point or points of the history of operation of the energy absorber those certain balls become operative to provide a second level of energy absorption. A further feature of the invention is in the provision in such an energy absorber of preformed recesses in one or both of the telescoping members of the energy absorber to contain the selected certain ones of the deformer ball complement out of interfering engagement with the walls of such members until a selected point in the travel of telescoping of the device is reached, whereupon such certain balls enter into interfering engagement between such members and establish a new level of energy absorption therein. Yet a further feature of the invention is that the selected certain ones of the deformer ball complement may be of such size related to the depth of the recesses so as not to establish any substantial load during the first portion of energy absorber displacement yet predeterminedly larger than the remainder of the ball complement so that a second high level of energy absorption may be established due not only to the presence of operation of such balls additively to the remainder of the complement but also due to the deeper plastic strain grooving caused by the oversized balls.

These and other features and advantages of the invention will be readily apparent from the following specification and from the drawings wherein.

Figure 1:
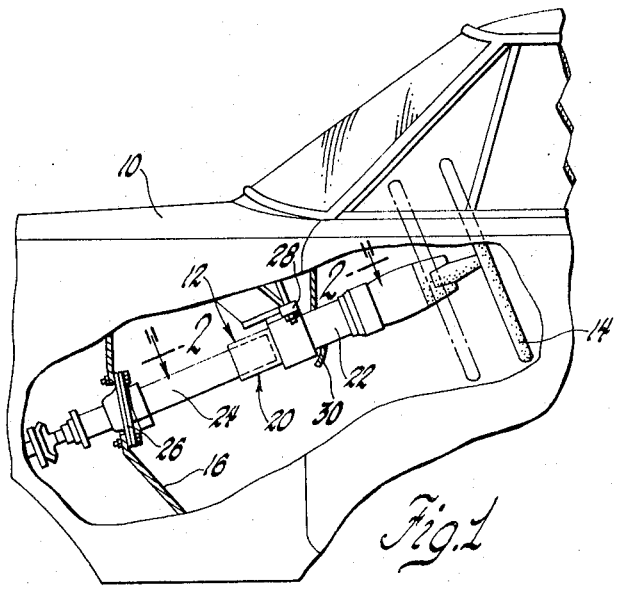
FIG. 1 is a partially broken away elevational view of an automotive vehicle body including a collapsible steering column assembly embodying an energy absorbing device according to the present invention.
Figure 4:
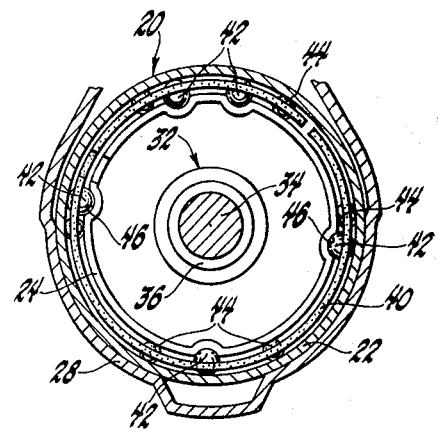
FIG. 4 is an enlarged sectional view taken generally along the plane indicated by lines 4—4 of FIG. 2.

Referring now particularly to FIG. 1 of the drawings, the energy absorbing device of the invention is disclosed as embodied particularly for use in an automobile collapsible steering column assembly 12 for a vehicle body 10. Reference may be had to the above-identified White patent for the details of structure and operation of column 12, but basically it includes an outer column or jacket 20 including upper and lower telescopically arranged cylindrical portions 22 and 24 respectively, rigidly joined by a structure hereinafter described and operative as an energy absorber according to the improvements generally contemplated in this invention. Jacket 20 is mounted rigidly adjacent its lower end on firewall 16 by a bracket assembly 26 and adjacent its other end by another bracket assembly 28 joining the column assembly releasably to the vehicle body instrument panel structure 30. Bracket assembly 26 holds lower portion 24 of the jacket assembly 20 rigidly with firewall 16 against displacement relative thereto in either direction axially along the jacket assembly, while bracket assembly 28 permits forward displacement of the upper portion 22 but prevents rearward displacement thereof relative to the instrument panel 30. A suitable upper bracket assembly functional in the described manner is disclosed in U.S. Pat. No. 3,476,345 to Ristau issued Nov. 4, 1969 and assigned to the assignee of the present invention.

Figure 2:
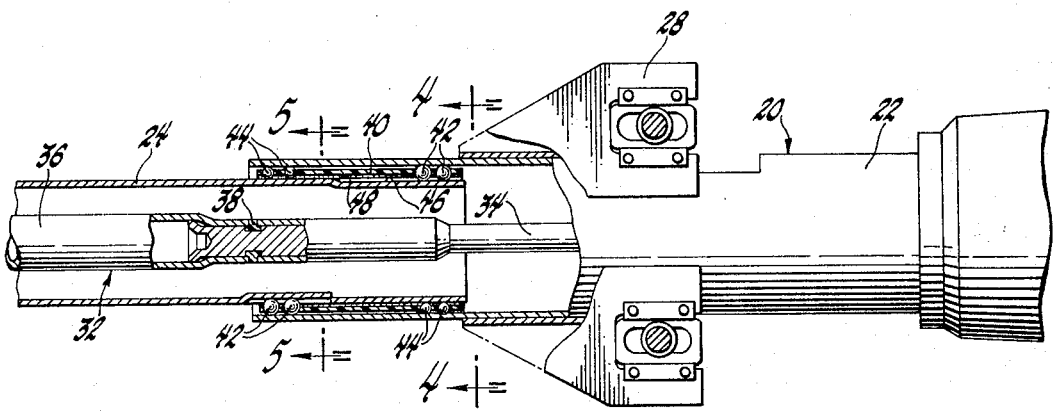
FIG. 2 is an enlarged partially broken away view of the steering column taken generally along the plane indicated by lines 2—2 of FIG. 1.

The jacket 20 rotatably supports and houses the conventional steering shaft 32, best seen in FIG. 2, extending from the steering wheel 14 through the jacket for connection at the other side of firewall 16 with the usual vehicle steering gear, not shown. The steering shaft assembly includes upper and lower telescopically arranged and relatively nonrotatable portions 34 and 36 joined by suitable shear plug structure 38 which holds the shaft sections in the position shown in FIG. 2 until a predetermined axial force is applied to the steering shaft in either direction sufficient to fracture the plugs. Under such axial force loading on the steering column assembly 12 in either direction and of a value exceeding a predetermined value as hereinafter described, both the steering shaft 32 and the jacket 20 will axially telescopically shorten or collapse, while the energy absorbing features of jacket 20 serve to dissipate the energy of the forces applied to the column during such collapse.

Figure 3:
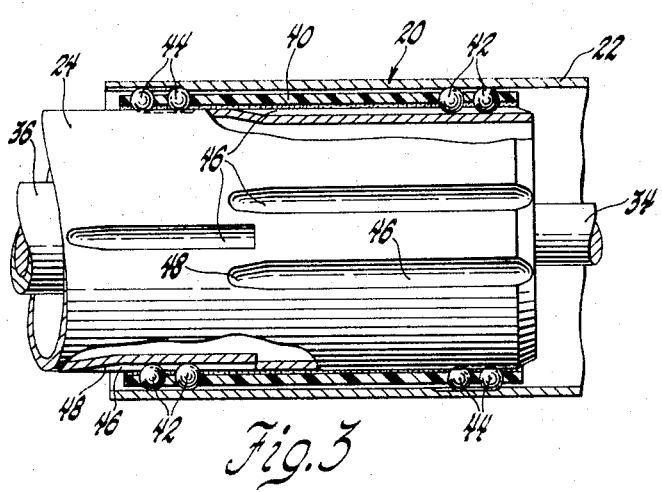
FIG. 3 is a further enlarged partially broken away view taken from a portion of FIG. 2.
Figure 5:
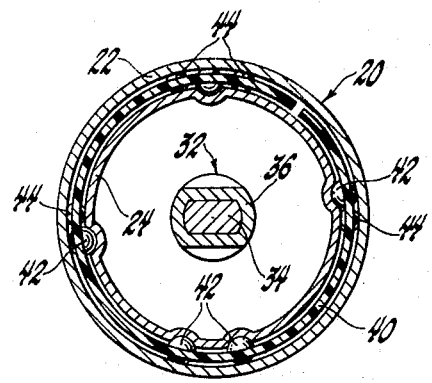
FIG. 5 is an enlarged sectional view taken generally along the plane indicated by lines 5—5 of FIG. 2.

Referring to FIGS. 2 and 3, the energy absorbing construction of the present invention and included in support jacket 20 is similar to that described in the White patent above-noted. Jacket portions or cylinders 22 and 24 have engaged therebetween a complement of deforming spheroids or balls which have such a degree of interference fit between the cylinders as to be operative to cause predetermined plastic strain groove-like deformation in the engaged regions of the cylinders when they are caused to telescope or collapse under predetermined force thereon, as would be experienced for example, when the vehicle operator's torso is caused to engage steering wheel 14. The various spheroids, as explained in White, have been typically selected in the past to be of such a size in relation to the diametrically measured annular gap between the portions 22 and 24 as to be interferingly engaged in this gap between the interior and exterior surfaces of the portions with a contact pressure substantially above the yield value or Hertzian yield stress for the material of one or both portions 22 and 24, so that the latter experience localized plastic deformation in the regions of the spheroid contact. The spheroids are preferably selected with a hardness at least two and one half times that of the cylinders to bring about this plasticity therein without substantially deforming the spheroids. When steering column assembly 12 is subjected to a predetermined substantial axial loading or impact, for example in a forward direction under engagement of the operator's torso with steering wheel 14, the jacket portion 22 seeks to telescope downwardly over portion 24 along with telescoping of steering shaft section 34 downwardly into section 36. As set out fully in White, the loading on column assembly 12 required for such collapse is controlled by correct sizing of the spheroids. As one of these jacket portions telescopes over the other, it causes the spheroids to roll in this same direction over the contacted surfaces of both portions such that the plastically strained regions of the surfaces thereof resulting from such rolling take the form of axially extending grooves or furrows. The energy dissipated in this plastic deformation of the jacket portions of course serves to effectively and gradually bring the steering column collapse to a halt and reduce the chances of injury to the vehicle occupants.

By the present invention, improvement is had in the operation of the deformer balls by providing for staged or differing levels of energy absorption in the energy absorber by establishing differing loads therein during the collapse and time history within the absorber. Such staging is useful, for example, in a particular application to the disclosed energy absorbing steering column among other uses, since it is desirable to construct the column so that a low level of force or energy absorption arises in the steering column during an initial portion of its collapse under operator torso impact and a higher level or levels is subsequently established. This is true since steering columns typically present additional forces resisting initial collapse of the column such as inertia within the substantial mass of the upper portion 22, and friction between the several telescoping parts as in the steering shaft and bracket assembly 28. By providing a low force within the energy absorber, these extraneous forces, generally determinable, may be added to provide a total resistance or load in the column assembly for whatever time period or collapse distance the extraneous forces are effective, whereafter, upon disappearance of these extraneous forces, the energy absorber itself provides a higher level or levels generally equal to and perhaps increased over the total load of the initial collapse period. Thus, the force which obtains in the steering column assembly plotted over the total distance of its collapse, (the integration of which of course represents the total energy absorbed) may be tailored for not only maximum total inch-pounds of energy absorption realized, but also so that in no particular increment of such collapse will too high a load resistance be presented to the operator's torso.

Figure 8:
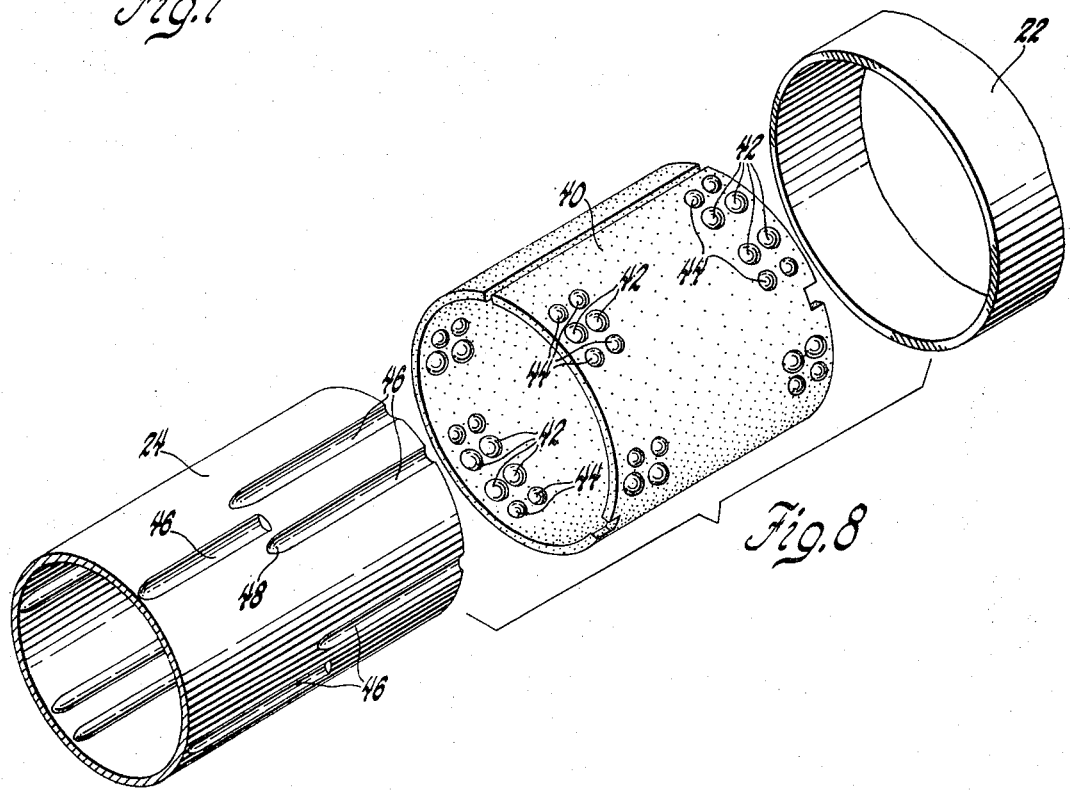
FIG. 8 is an exploded perspective view.

Referring particularly to FIG. 2, this is accomplished by providing a complement of deformer balls including two annular groupings spaced axially of each other a sufficient distance to provide for column rigidity. The two groupings of deformer balls are carried within apertures or pockets perforated within a ball carrying sleeve 40 resting within the annular gap between the jacket portions 22 and 24 out of any contact therewith and preferably constructed of a split thermoplastic material tube. Within each grouping, there is disclosed two annular rows of deformer balls spaced angularly of each other in each row, such spacing being shown best in FIG. 8. In each row, there is provided a first set of deformer balls 42 each of a predetermined large diameter and another set 44 each of a diameter smaller than that of set 42. Also as seen best in FIG. 8, the set of large balls 42 in each row are aligned with their counterparts in the adjacent row in each axial grouping, but the large balls in the groupings are staggered angularly with respect to those in the other grouping so that they will not travel the same longitudinal paths angularly around portions 22 and 24 during column collapse. The double row of groupings have been found to provide increased column rigidity and energy absorbing performance and it will be noted that, as seen in FIG. 8, additional deformer balls are installed at the top side of the steering column in the upper grouping and at the bottom side in the lower grouping to provide increased resistance to an overturning couple or bending moment which can arise in normal use of the column by the tendency of the vehicle driver to bear downwardly on the steering wheel 14 for support while entering and leaving the vehicle or otherwise.

Referring to FIG. 3, the deformer balls 44 in each axial grouping are engaged with a predetermined interference fit, selected as above-described, between the walls of the jacket portions 22 and 24 in the initial assembled position of the energy absorber. Accordingly, these balls 44 are operative immediately upon application of impact force to either end of the steering column to provide a level of force sustainment and energy absorption in the column arising from telescoping displacement between the jacket portions. The balls 42, on the other hand, are located out of any substantial interfering engagement between such walls and are not operative to cause any load establishment or energy absorption during such initial displacement in the column. This is due to the location of balls 42 within preformed recesses 46 in jacket portion 24, which recesses are of a depth sufficient to provide a ball pocket, including the annular gap between the jacket portions, of substantially the same size as the diameter of the balls 42. Alternatively, some slight interference engagement may be provided by a slightly shallower recess for each ball 42 so that firmer contact and rigidifying of the column in normal use may be had from those balls. At the end of each recess 46 is a tapering or inclined wall 48 leading to the full diametral cylindrical wall of the lower jacket portion 24. The length of the recess 46 longitudinally of the lower jacket portion is chosen to correspond with the desired amount of initial steering column collapse for which only the level of energy absorption due solely to deformer balls 44 is desired. It is of course to be appreciated that balls 42 travel recesses 46 during this initial distance of collapse by virtue of being carried therethrough by displacement of sleeve 40 unitarily with telescoping of the jacket portions and rolling of balls 44 at generally one half the rate of jacket telescoping. Thus, if recesses 46 are all of a length of 2 inches, telescopic foreshortening of the steering column assembly by four inches will bring balls 42 to the inclined walls 48.

At this point, further telescoping of the steering column will cause balls 42 to travel up the inclined walls 48 into the annular gap between the jacket portions chosen for the balls 44. Accordingly, balls 42 become engaged with a predetermined interference fit between the walls of portions 22 and 24 to become operative for predetermined plastic strain grooving therein similar to that which has already arisen from balls 44 during the initial collapse period. Due to the larger diameter of balls 42, a higher level of load and energy absorption will result from such grooving due not only to the additional grooves caused by those balls but the greater depth and upsetting of metal caused thereby in comparison with that caused by the balls 44.

Several variations of the staging of energy absorption available from the use of preformed recesses such as 42 and the placement of selected size balls 42 therein will be apparent to those skilled in the art. For example, the balls 42 may be of substantially the same size as balls 44 but capable of a staged higher energy absorption force due to merely their presence in the plastic strain grooving operation at the completion of the initial collapse period. Likewise, the same size balls in both sets 42 and 44 may be used and recesses 46 for balls 42 may be selected of differing lengths so that different ones of balls 42 come into interfering engagement at different points in the history of collapse of column 12 to provide for multiple staging of load and energy absorption. Further, such multiple staging can include not only different length recesses 46 but also differing sizes of balls in the set 42.

Figure 6:
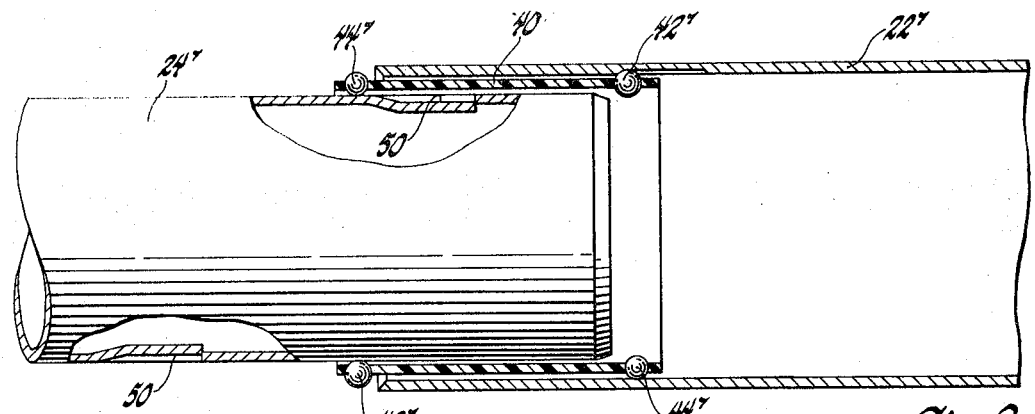
FIG. 6 is a partially broken away view similar to FIG. 2 illustrating a modification of the present invention with the parts in a first condition during assembly.
Figure 7:
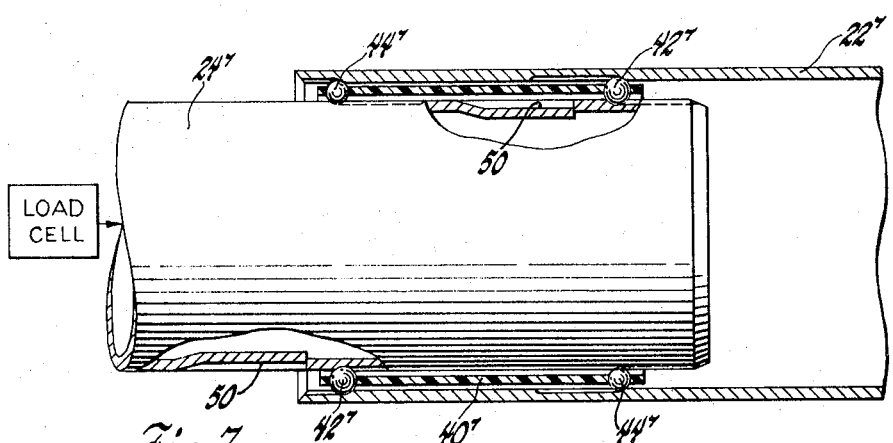
FIG. 7 is a view similar to FIG. 6 showing another condition of assembly of the parts.

A modification of this invention is illustrated in FIGS. 6 and 7. In the manufacture and assembly of energy absorbers in accordance with the White patent, it has been found useful to assemble the deformer balls and sleeve 40 between the jacket portions by a method permitting measurement of the load or force sustained during such assembly procedure so that the load which will arise in the absorber during impact absorption performance in the field can be predicted. Thus, too small a load due to balls of too small diameter may be reflected in assembly and larger balls installed, thereby to correct for manufacturing variations in tube size involved in making jacket portions 22 and 24. FIGS. 6 and 7 illustrate energy absorber structure which will accommodate such force measuring assembly procedures. As opposed to providing recesses 46 in a location opening their ends directly at the terminal end portion at, for example, jacket portion 24, an extra amount of length is provided in such portion and all of the recesses 46 are remote from such terminal end portion.

Referring particularly to FIG. 6, jacket portions 22' and 24' are provided to be assembled in a manner similar to that described in the Butts patent, U.S. Pat. No. 3,538,783 issued Nov. 10, 1970 and assigned to the assignee of the present invention. A sleeve 40' is provided and carries axially spaced groupings of deformer balls each of which groupings includes sets of balls 42' and 44'. For each deformer ball 42' there is provided in jacket portion 24' recesses 50 sized in accordance with the principles outlined above for the first embodiment. Rather than having recesses 50 include ones which extend to the marginal edge of jacket portion 24 however, recesses 50 are all remote from such edge. Accordingly, during the assembly of the energy absorber in accordance with the Butts patent, telescopic foreshortening displacement between the jacket portions will cause interfering engagement between the chamfered leftward marginal edge of jacket portion 22' and all of the balls in the leftward axial grouping engaged on the outer cylindrical surface of jacket portion 24', while rightward movement relatively of the marginal edge of jacket portion 24' will similarly interferingly engage the rightward axial grouping of deformer balls engaged on the inner cylindrical surface of jacket portion 22'. Telescoping foreshortening between such jacket portions proceeds through the condition illustrated in FIG. 7 and past the same until larger balls 42' fall into the recesses 50 which have been aligned therewith, this occurring in both the axially spaced groupings of balls at the same point in the assembly of the jacket portions. Accordingly, it will be seen that a load cell measuring the force required to assemble the jacket portions, as described in the Butts patent, will read not only the force due to the deformer balls 44' but also that due to balls 42' over that telescoping distance represented by the space between the marginal edge of jacket portion 24' and the closest end of recesses 50. Accordingly, prediction may be made of the latter stage of load which will be seen in actual field conditions due not only to the contributions of balls 44' but also that due to the combined action of balls 42' and 44'.

Having thus described the invention, what is claimed is:

1. In an energy absorber of the type which includes a pair of telescopically related tubes having engaged between the walls thereof with predetermined interference fit a complement of deformer balls adapted to roll over the walls of the tubes during telescoping movement of the tubes and to plastically deform such walls, the improvement which comprises means defining in the wall of at least one of said tubes a selected number of recesses of a number less than in said complement and of predetermined depth and limited length extending in the direction of telescoping movement of the tubes, said recesses receiving certain of said complement of balls, the depth of said recesses and the size of said certain balls being related such that the latter are adapted to travel the recesses in unison with the remainder of the ball complement outside the recesses during such tube telescoping and freely of any substantial interfering engagement thereof between the walls of the tubes, said certain balls at the end of such travel being engageable with predetermined substantial interference fit between the walls of the tubes to roll during further telescoping movement thereof and plastically deform such walls, whereby said energy absorber provides a first level of energy absorption from the effect of interfering engagement of said remainder of the ball complement and a second level of energy absorption comprising the effect of interfering engagement of said certain balls.

2. In the improved energy absorber set forth in claim 1, the lengths of the several said recesses available for said substantially non-interfering engagement of the balls therein being predeterminedly different whereby said end of travel among said certain balls occurs at different points in the telescoping of said tubes and graduated change is had between said first and second levels of energy absorption.

3. In an energy absorber of the type which includes a pair of telescopically related tubes having engaged between the walls thereof with predetermined interference fit a complement of deformer balls adapted to roll over the walls of the tubes during telescoping movement of the tubes and to plastically deform such walls, the improvement which comprises means defining in the wall of at least one of said tubes a selected number of recesses of a number less than in said complement and of predetermined depth and limited length extending in the direction of telescoping movement of the tubes, and deformer balls in said recesses predeterminedly larger in size than the remainder of the balls in said complement outside said recesses yet of such size with respect to the depth of said recesses as to be adapted to travel the recesses in unison with said remainder during such tube telescoping freely of any substantial interfering engagement between the walls of the tubes, said larger balls at the end of such travel being engageable with predetermined substantial interference fit between the walls of the tubes to roll during further telescoping movement thereof and plastically deform such walls, whereby said energy absorber provides a first level of energy absorption from the effect of interfering engagement of said remainder of the ball complement and a second level of energy absorption comprising the effect of interfering engagement of said larger balls.

4. In the improved energy absorber set forth in claim 3, the lengths of the several said recesses available for said substantially non-interfering engagement of the balls therein being predeterminedly different whereby said end of travel among said oversized balls occurs at different points in the telescoping of said tubes and graduated change is had between said first and second levels of energy absorption.

5. An energy absorber including a pair of telescopically related tubes, a first set of deformer balls arranged in at least two spaced annular rows and engaged between the walls of said tubes with predetermined interference fit to roll over the walls of the tubes during telescoping movement of the tubes and to plastically deform such walls, means defining in the wall of at least one of said tubes and for each of said annular rows a selected number of recesses of predetermined limited length extending in the direction of telescoping movement of the tubes, said recesses being staggered angularly in each said row with respect to the said first set of balls in that row, and a set of further balls in said recesses predeterminedly oversized with respect to said first set of balls, a ball carrying sleeve intermediate said tubes and receiving both said sets of balls and operative to cause said oversized ones thereof to travel the recesses in unison with rolling of said first set of balls during telescoping of said tubes, the size of said oversized balls being such with respect to the depth of said recesses that said traveling of said oversized balls occurs freely of any substantial interfering engagement between the walls of the tubes, said oversized balls at the end of such travel being engageable with predetermined substantial interference fit between the walls of the tubes to roll during further telescoping movement thereof and plastically deform such walls, whereby said energy absorber provides a first level of energy absorption from the effect of interfering engagement of said remainder of the ball complement and a second level of energy absorption comprising the effect of interfering engagement of said oversized balls.

* * * * *